(12) United States Patent
Fischer et al.

(10) Patent No.: US 7,814,626 B2
(45) Date of Patent: Oct. 19, 2010

(54) PROCESS FOR THE PREPARATION OF POLYCARBONATE BY THE MELT TRANSESTERIFICATION PROCESS

(75) Inventors: Pete Fischer, Cologne (DE); Wilfried Haese, Odenthal (DE); Alexander Meyer, Duesseldorf (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/117,798

(22) Filed: May 9, 2008

(65) Prior Publication Data

US 2008/0319156 A1 Dec. 25, 2008

(30) Foreign Application Priority Data

May 11, 2007 (DE) .................. 10 2007 022 130

(51) Int. Cl.
*C08G 64/00* (2006.01)
*C08G 63/02* (2006.01)

(52) U.S. Cl. .................. 28/196; 264/176.1; 264/219; 264/328.1; 428/64.4; 428/451; 524/91; 524/154; 524/306; 524/317; 524/451; 524/611; 528/198

(58) Field of Classification Search .............. 264/176.1, 264/219, 328.1; 428/64.4; 524/91, 154, 524/306, 317, 451, 611; 525/155, 156, 462; 528/196, 198
See application file for complete search history.

(56) References Cited

U.S. PATENT DOCUMENTS

| | | | |
|---|---|---|---|
| 3,022,272 A | 2/1962 | Schnell et al. | |
| 5,340,905 A | 8/1994 | Kuhling et al. | |
| 5,399,659 A | 3/1995 | Kuhling et al. | |
| 5,668,202 A | 9/1997 | Hirata et al. | |
| 6,022,943 A | 2/2000 | Inoue et al. | |
| 6,262,218 B1 | 7/2001 | Inoue et al. | |
| 6,265,525 B1 | 7/2001 | Kinoshita et al. | |
| 6,300,459 B1 | 10/2001 | Kaneko et al. | |
| 6,403,754 B1 | 6/2002 | McCloskey et al. | |
| 6,630,563 B2 | 10/2003 | Hucks et al. | |
| 6,703,473 B2 | 3/2004 | Hucks et al. | |
| 6,887,970 B2 | 5/2005 | Kratschmer et al. | |
| 7,250,483 B2 | 7/2007 | Heuer et al. | |
| 7,259,223 B2 | 8/2007 | Brack et al. | |
| 7,279,544 B2 | 10/2007 | Hucks et al. | |
| 7,425,358 B2 * | 9/2008 | Heuer et al. | 428/64.7 |
| 2005/0288407 A1 | 12/2005 | Heuer et al. | |
| 2006/0132912 A1 | 6/2006 | Haese et al. | |
| 2006/0134366 A1 | 6/2006 | Haese et al. | |
| 2006/0135735 A1 | 6/2006 | Meyer et al. | |
| 2006/0135736 A1 | 6/2006 | Meyer et al. | |
| 2006/0155098 A1 | 7/2006 | Kauth et al. | |

FOREIGN PATENT DOCUMENTS

| | | |
|---|---|---|
| DE | 1031512 | 6/1958 |
| DE | 2119799 | 11/1972 |
| DE | 3832396 A1 | 2/1990 |
| DE | 4438545 A1 | 5/1996 |
| DE | 4447422 A1 | 7/1996 |
| DE | 10100404 A1 | 7/2002 |
| DE | 10357161 A1 | 6/2005 |
| DE | 102004061715 A1 | 7/2006 |
| DE | 102004061754 A1 | 7/2006 |
| DE | 60126431 T2 | 8/2007 |
| EP | 0435124 A2 | 7/1991 |
| EP | 0922728 A2 | 6/1999 |
| EP | 0980861 A1 | 2/2000 |
| EP | 1253163 A1 | 10/2002 |
| EP | 1304358 A2 | 4/2003 |
| EP | 1609818 A2 | 12/2005 |
| EP | 1612213 A1 | 1/2006 |
| EP | 1612231 A1 | 1/2006 |
| FR | 1561518 | 3/1969 |
| GB | 1229482 | 4/1971 |
| JP | 62-207358 | 9/1987 |
| WO | WO-99/28370 A1 | 6/1999 |
| WO | WO-00/50488 A1 | 8/2000 |
| WO | WO-02/077067 A2 | 10/2002 |
| WO | WO-03/031497 A1 | 4/2003 |

* cited by examiner

*Primary Examiner*—Terressa M Boykin
(74) *Attorney, Agent, or Firm*—Connolly Bove Lodge & Hutz LLP

(57) ABSTRACT

The invention provides a process for the preparation of polycarbonate by the melt transesterification process, polycarbonate having a low electrostatic charge obtainable by this process, and moldings or extrudates, in particular optical data storage media or light-diffusing plates, made from this polycarbonate.

20 Claims, No Drawings

PROCESS FOR THE PREPARATION OF POLYCARBONATE BY THE MELT TRANSESTERIFICATION PROCESS

RELATED APPLICATIONS

This application claims benefit to German Patent Application No. 10 2007022130 filed May 11, 2007 which is incorporated by reference in its entirety for all useful purposes.

1. Field of Invention

The invention provides a process for the preparation of polycarbonate by the melt transesterification process, polycarbonate having a low electrostatic charge obtainable by this process, and mouldings or extrudates, in particular optical data storage media or light-diffusing plates, made from this polycarbonate.

2. Background of the Invention

Optical data recording materials are increasingly being used as a variable recording and/or archiving medium for large amounts of data. Examples of this type of optical data storage media are compact disks ("CD"), super-audio CD, CD-R, CD-RW, DVD, DVD-R, DVD+R, DVD-RW, DVD+RW, HD-DVD and BD.

Transparent thermoplastic plastics materials, such as, for example, polycarbonate, polymethyl methacrylate and chemical modifications thereof, are typically used for optical storage media. Polycarbonate as substrate material is suitable in particular for optical disks that are writable once and readable repeatedly as well as for optical disks that are writable repeatedly, and also for the production of mouldings from the automotive glazing sector, such as, for example, light-diffusing plates. The thermoplastic plastic material has excellent mechanical stability, has low susceptibility to dimensional changes and is distinguished by high transparency and impact strength.

According to DE-A 2 119 799, the preparation of polycarbonates with the involvement of phenolic end groups can be carried out by the interfacial process as well as by the process in homogeneous phase.

A further industrially used process for the preparation of polycarbonate is the melt transesterification process. Polycarbonate prepared by this process can in principle be used for the production of optical data storage media of the above-described formats, such as, for example, for compact disks (CDs) or digital versatile disks (DVDs).

However, this process has hitherto had the disadvantage that it yields polycarbonates which, after processing to injection-moulded bodies, have the property of building up high electric fields on the surface of the injection-moulded article. Thus, for example, disks for optical data storage media made from this polycarbonate build up a high electric field during their production by the injection-moulding process. During the production of the optical data storage media, this high field strength on the substrate leads, for example, to dust being attracted from the environment or to the injection-moulded articles, for example the disks, sticking together, which reduces the quality of the finished injection-moulded articles and additionally renders the injection-moulding process more difficult.

Furthermore, the electrostatic charging in particular of disks (for optical data carriers) leads to a lack of wettability especially with non-polar media, such as, for example, a non-polar dye or a dye application from solvents, such as, for example, dibutyl ether, ethylcyclohexane, tetrafluoropropanol, cyclohexane, methylcyclohexane or octafluoropropanol. For example, a high electric charge on the surface of the substrate during dye application in the case of writable data storage media leads, for example, to irregular and incomplete coating with dye and accordingly results in defects in the information layer.

In the case of an optical data storage medium in which a writable dye is applied to the surface in a spin coating process, a low absolute electric field strength is therefore required in order to ensure the uniform application of the writable layer and a trouble-free production process.

The electrostatic charge of a substrate material leads to an electric field which can be quantified by measurement at a specific distance from the substrate surface.

A further disadvantage of such a high electric field is additionally to be seen in losses of yield with regard to the substrate material, on account of the above-described facts. This leads to losses of production and accordingly causes corresponding additional costs.

The electric field which forms on the injection-moulded parts during the injection-moulding process is not constant during the production process but follows a particular field strength pattern. Thus, it is shown that the field strength on the disks in question increases after the start of the injection-moulding process (provided a new matrix is used) and reaches a plateau or increases further only slightly after a certain period of time. This is an important criterion for the performance of the injection-moulded part in the subsequent production step, in which, for example, the dye is applied to the substrate. The time-dependent charging of injection-moulded bodies produced from polycarbonate by the melt transesterification process differs from that of injection-moulded bodies produced from polycarbonate by the interfacial process. The starting value of the field strength at the beginning of the injection-moulding process in the case of polycarbonate prepared by the melt transesterification process is in most cases markedly lower than in the case of polycarbonate prepared by the interfacial process. The plateau value which is established after a certain running time, such as, for example, after 2 hours of a continuous injection-moulding process, is frequently markedly in the negative range (negative field strength), in contrast to polycarbonate prepared by the interfacial process.

Several approaches have been followed to solve the problem of a high electrostatic charge. In general, antistatics are added to the substrate material as additives. Such polycarbonate compositions with added antistatics are described, for example, in JP-A 62 207 358, wherein polyethylene or polypropylene derivatives are used as additives. Phosphoric acid derivatives inter alia are added to the polycarbonate as antistatics here. EP-A 922 728 describes various antistatics, such as polyalkylene glycol derivatives, ethoxylated sorbitan monolaurate, polysiloxane derivatives, phosphine oxides as well as distearylhydroxyamine, which can be used individually or in the form of mixtures. Japanese application JP-A 62 207 358 describes esters of phosphorous acid as additives having antistatic activity. In U.S. Pat. No. 5,668,202, sulfonic acid derivatives are described as additives.

U.S. Pat. Nos. 6,262,218 and 6,022,943 describe the use of phenyl chloroformate in order to increase the end group content in the melt polycarbonate polycarbonate prepared by the melt transesterification process). It is postulated therein that an end group content of more than 90% has a positive effect on the electrostatic properties. In WO-A 00/50 488, 3,5-di-tert-butyl phenol is used as chain terminator in the interfacial process. This chain terminator results in a lower static charge of the corresponding substrate material as compared with conventional chain terminators. EP-A 1 304 358 describes the use of short oligomers such as, for example, bisphenol A bis-(4-tert-butylphenyl carbonate) as additives in polycarbonate from the melt transesterification process.

The described additives can, however, have an adverse effect on the properties of the substrate material, because they have a tendency at high temperatures to migrate from the material and can consequently lead to the formation of a coating or to imperfect release from the mould. Furthermore, the content of oligomers in the polycarbonate can also lead to a poorer level of mechanical properties and to a lowering of the glass transition temperature. In addition, these additives as added substances can cause secondary reactions. The thermal stability of the base material can be lowered as a result. The subsequent "end capping" of polycarbonate obtained from the transesterification process is complex. The substances necessary therefor must be prepared, which is associated with additional costs and an additional process step for the subsequent "end capping".

DE-A 10 2004 061 754, DE-A 10 2004 061 715, US-A 2006135736, US-A 2006135735 and US-A 2006134366 describe materials which are particularly suitable for the production of low-charge injection-moulded bodies. However, these materials are solely polycarbonates that have been prepared by the interfacial process. The described measures have no effect in the melt transesterification process.

In order to ensure good coatability of optical data storage media in the production process, so-called ionisers are frequently used, which pass an ionised air stream over the disks. The use of ionisers makes the production process more expensive, however, so that for an economical process the number of ionisers to be used should be reduced to a minimum.

SUMMARY OF THE INVENTION

Accordingly, there is a continued need for a process for the preparation of polycarbonate by the melt transesterification process which is suitable for processing to moulded bodies or extrudates having a low electrostatic charge. In addition, it would be desirable for as few deposits as possible to occur on tools or on the corresponding mouldings during processing to moulded bodies or extrudates.

The object was, therefore, to provide a melt transesterification process and a polycarbonate prepared by means of this process which, after processing to a moulded body or extrudate, meets the requirements of as low a charge as possible on the substrate surface and avoids the disadvantages described hereinbefore.

Surprisingly, this object is achieved as follows: in a multi-stage melt transesterification process, at least one inhibitor is added to the melt before the last reaction stage, and one or more aromatic hydroxycarboxylic acids or derivatives thereof are added in or after the last reaction stage. Polycarbonates prepared by the process according to the invention do not have the disadvantages mentioned hereinbefore and are outstandingly suitable for processing to moulded bodies or extrudates having a low electrostatic charge.

The present invention therefore provides a process for the preparation of polycarbonate which comprises a the melt transesterification process, which comprises reacting at least one dihydroxyaryl compound in a multi-stage process with at least one diaryl carbonate using at least one catalyst, wherein at least one inhibitor is added to the melt before the last reaction stage, and one or more aromatic hydroxycarboxylic acids or derivatives thereof are added in or after the last reaction stage.

A DETAILED DESCRIPTION OF THE INVENTION

As used herein, the singular terms "a" and "the" are synonymous and used interchangeably with "one or more." Additionally, all numerical values, unless otherwise specifically noted, are understood to be modified by the word "about."

The process according to the invention is carried out according to the melt transesterification process. The preparation of aromatic oligo- or poly-carbonates by the melt transesterification process is known in the literature and is described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964), p. 44-51, as well as in DE-C 10 31 512, U.S. Pat. Nos. 3,022,272, 5,340,905 and 5,399,659.

According to this process, aromatic dihydroxy compounds are transesterified in the melt with carbonic acid diesters with the aid of suitable catalysts and optionally further additives.

The process is carried out in a plurality of stages, generally in reactors connected in series, in which the molecular weight and hence the viscosity of the polycarbonate is increased stepwise.

A system design as described in WO-A 02/077 067, for example, can be used for carrying out the process according to the invention. In this design, the polycarbonate synthesis is carried out by transesterification of diaryl carbonates with dihydroxyaryl compounds in the presence of quaternary onium compounds, wherein an oligocarbonate is prepared in a plurality of evaporator stages, with temperatures increasing stepwise and pressures falling stepwise, which oligocarbonate is condensed to the polycarbonate in one or two basket reactors arranged in series, as the temperatures rise and the pressures fall further.

Suitable dihydroxyaryl compounds for the process according to the invention are those of the general formula (I)

HO—Z—OH (I)

wherein Z is an aromatic radical having from 6 to 34 carbon atoms which can contain one or more optionally substituted aromatic nuclei and aliphatic or cycloaliphatic radicals or alkylaryls or hetero atoms as bridging members.

Examples of suitable dihydroxyaryl compounds are: dihydroxybenzenes, dihydroxydiphenyls, bis-(hydroxyphenyl)-alkanes, bis-(hydroxyphenyl)-cycloalkanes, bis-(hydroxyphenyl)-aryls, bis-(hydroxyphenyl)ethers, bis-(hydroxyphenyl) ketones, bis-(hydroxyphenyl)sulfides, bis-(hydroxyphenyl)-sulfones, bis-(hydroxyphenyl)sulfoxides, 1, 1'-bis-(hydroxyphenyl)-diisopropylbenzenes, as well as compounds thereof that are alkylated on the ring and compounds thereof that are halogenated on the ring.

These and further suitable other dihydroxyaryl compounds are described, for example, in DE-A 3 832 396, FR-A 1 561 518, in H. Schnell, Chemistry and Physics of Polycarbonates, Interscience Publishers, New York 1964, p. 28 ff, p. 102 ff, and in D. C. Legrand, J. T. Bendler, Handbook of Polycarbonate, Science and Technology, Marcel Dekker New York 2000, p. 72 ff.

Preferred dihydroxyaryl compounds are, for example, resorcinol, 4,4'-dihydroxydiphenyl, bis-(4-hydroxyphenyl)-methane, bis-(3,5-dimethyl-4-hydroxyphenyl)-methane, bis-(4-hydroxyphenyl)-diphenyl-methane, 1,1-bis-(4-hydroxyphenyl)-1-phenyl-ethane, 1,1-bis-(4-hydroxyphenyl)-1-(1- naphthyl)-ethane, 1,1-bis-(4-hydroxyphenyl)-1-(2-naphthyl)-ethane, 2,2-bis-(4-hydroxyphenyl)-propane, 2,2-bis-(3-methyl-4-hydroxyphenyl)-propane, 2,2-bis-(3,5-dimethyl-4-hydroxyphenyl)-propane, 2,2-bis-(4-hydroxyphenyl)-1-phenyl-propane, 2,2-bis-(4-hydroxyphenyl)-hexafluoro-propane, 2,4-bis-(4-hydroxyphenyl)-2-methyl-butane, 2,4-bis-(3,5-dimethyl-4-hydroxyphenyl)-2-methylbutane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-4-methyl-cyclohexane, 1,1-bis-(4-hydroxyphenyl)-3,3,5-trimethyl-cyclohexane, 1,3-bis-[2-(4-hydroxyphenyl)-2-propyl]-benzene, 1,1'-bis-(4-hydroxyphenyl)-3-diisopropyl-benzene, 1,1'-bis-(4-hydroxyphenyl)-4-diisopropyl-benzene, 1,3-bis-[2-(3,5-dimethyl-4-hydroxyphenyl)-2-propyl]-benzene, bis-(4-hydroxyphenyl)ether, bis-(4-hydroxyphenyl)sulfide, bis-(4-hydroxyphenyl)-sulfone, bis-(3,5-dimethyl-4-hydroxyphenyl)-sulfone and 2,2',3,3'-tetrahydro-3,3,3',3'-tetramethyl-1,1'-spirobi-[1H-indene]-5,5'-diol.

Particularly preferred dihydroxyaryl compounds are resorcinol, 4,4'-dihydroxydiphenyl, bis-(4-hydroxyphenyl)-diphenyl-methane, 1,1-bis-(4-hydroxyphenyl)-1-phenyl-ethane, bis-(4-hydroxyphenyl)-1-(1-naphthyl)-ethane, bis-(4-hydroxyphenyl)-1-(2-naphthyl)-ethane, 2,2-bis-(4-hydroxyphenyl)-propane, 2,2-bis-(3,5-dimethyl-4-hydroxyphenyl)-propane, 1,1-bis-(4-hydroxyphenyl)-cyclohexane, 1,1-bis-(3,5-dimethyl-4-hydroxyphenyl)-cyclohexane, 1,1-bis-(4-hydroxyphenyl)-3,3,5-trimethyl-cyclohexane, 1,1'-bis-(4-hydroxyphenyl)-3-diisopropyl-benzene and 1,1'-bis-(4-hydroxyphenyl)-4-diisopropyl-benzene.

Very particularly preferred dihydroxyaryl compounds are 4,4'-dihydroxydiphenyl, 2,2-bis-(4-hydroxyphenyl)-propane and bis-(4-hydroxyphenyl)-3,3,5-trimethyl-cyclohexane.

It is possible to use both one dihydroxyaryl compound to form homopolycarbonates and various dihydroxyaryl compounds to form copolycarbonates.

The dihydroxyaryl compounds can also be used with residual contents of the monohydroxyaryl compounds from which they were prepared, or the low molecular weight oligocarbonates with residual contents of the monohydroxyaryl compounds which were separated off during the preparation of the oligomers. The residual contents of the monohydroxyaryl compounds can be up to 20 wt. %, preferably up to 10 wt. %, particularly preferably up to 5 wt. % and very particularly preferably up to 2 wt. %. Therefore the residual content of the monohydroxyaryl compounds can be preferably 0 wt. % or present in an amount up to 2 wt. %.

The diaryl carbonates suitable for reaction with the dihydroxyaryl compounds are those of the general formula (II)

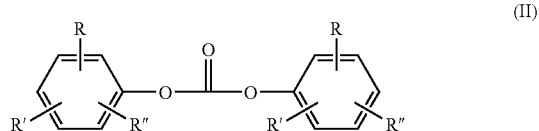

(II)

wherein

R, R' and R" independently of one another are identical or different and represent hydrogen, linear or branched $C_1$-$C_{34}$-alkyl, $C_7$-$C_{34}$-alkylaryl or $C_6$-$C_{34}$-aryl, R can further also represent —COO—R''', wherein R''' represents hydrogen, linear or branched $C_1$-$C_{34}$-alkyl, $C_7$-$C_{34}$-alkylaryl or $C_6$-$C_{34}$-aryl.

Preferred diaryl carbonates are, for example, diphenyl carbonate, methylphenyl-phenyl carbonates and di-(methylphenyl)carbonates, 4-ethylphenyl-phenyl carbonate, di-(4-ethylphenyl)carbonate, 4-n-propylphenyl-phenyl carbonate, di-(4-n-propylphenyl)carbonate, 4-isopropylphenyl-phenyl carbonate, di-(4-isopropylphenyl)carbonate, 4-n-butylphenyl-phenyl carbonate, di-(4-n-butylphenyl)carbonate, 4-isobutylphenyl-phenyl carbonate, di-(4-isobutylphenyl) carbonate, 4-tert-butylphenyl-phenyl carbonate, di-(4-tert-butylphenyl)carbonate, 4-n-pentyl-phenyl-phenyl carbonate, di-(4-n-pentylphenyl)carbonate, 4-n-hexylphenyl-phenyl carbonate, di-(4-n-hexylphenyl)carbonate, 4-isooctylphenyl-phenyl carbonate, di-(4-isooctylphenyl)carbonate, 4-n-nonylphenyl-phenyl carbonate, di-(4-n-nonyl-phenyl)carbonate, 4-cyclohexylphenyl-phenyl carbonate, di-(4-cyclohexylphenyl)carbonate, 4-(1-methyl-1-phenylethyl)-phenyl-phenyl carbonate, di-[4-(1-methyl-1-phenylethyl)-phenyl]carbonate, biphenyl-4-yl-phenyl carbonate, di-(biphenyl-4-yl)carbonate, 4-(1-naphthyl)-phenyl-phenyl carbonate, 4-(2-naphthyl)-phenyl-phenyl carbonate, di-[4-(1-naphthyl)-phenyl] carbonate, di-[4-(2-naphthyl)phenyl]carbonate, 4-phenoxyphenyl-phenyl carbonate, di-(4-phenoxyphenyl) carbonate, 3-pentadecylphenyl-phenyl carbonate, di-(3-pentadecylphenyl)carbonate, 4-trityl-phenyl-phenyl carbonate, di-(4-tritylphenyl)carbonate, methyl salicylate-phenyl carbonate, di-(methyl salicylate) carbonate, ethyl salicylate-phenyl carbonate, di-(ethyl salicylate) carbonate, n-propyl salicylate-phenyl carbonate, di-(n-propyl salicylate) carbonate, isopropyl salicylate-phenyl carbonate, di-(isopropyl salicylate) carbonate, n-butyl salicylate-phenyl carbonate, di-(n-butyl salicylate) carbonate, isobutyl salicylate-phenyl carbonate, di-(isobutyl salicylate) carbonate, tert-butyl salicylate-phenyl carbonate, di-(tert-butyl salicylate) carbonate, di-phenyl salicylate)-carbonate and di-(benzyl salicylate) carbonate.

Particularly preferred diaryl compounds are diphenyl carbonate, 4-tert-butylphenyl-phenyl carbonate, di-(4-tert-butylphenyl)carbonate, biphenyl-4-yl-phenyl carbonate, di-(biphenyl-4-yl)carbonate, 4-(1-methyl-1-phenylethyl)-phenyl carbonate, di-[4-(1-methyl-1-phenylethyl)-phenyl] carbonate and di-(methyl salicylate) carbonate.

Diphenyl carbonate is very particularly preferred.

It is possible to use both one diaryl carbonate and various diaryl carbonates.

The diaryl carbonates can also be used with residual contents of the monohydroxyaryl compounds from which they were prepared. The residual contents of the monohydroxyaryl compounds can be up to 20 wt. %, preferably up to 10 wt. %, particularly preferably up to 5 wt. % and very particularly preferably up to 2 wt. %. Therefore the residual content of the monohydroxyaryl compounds can be 0 wt. % or present in an amount up to 2 wt. %.

Based on the dihydroxyaryl compound(s), from 1.02 to 1.30 mol of the diaryl carbonate(s), preferably from 1.04 to 1.25 mol, particularly preferably from 1.045 to 1.22 mol, very particularly preferably from 1.05 to 1.20 mol are used per mole of dihydroxyaryl compound. It is also possible to use mixtures of the above-mentioned diaryl carbonates, the molar amounts per mole of dihydroxyaryl compound indicated hereinbefore then relating to the total amount of the mixture of diaryl carbonates.

In order to control or change the end groups, it is possible to use in addition one or more monohydroxyaryl compound(s) which has/have not been employed in the preparation of the diaryl carbonate(s) used. The monohydroxyaryl compounds can be those of the general formula (III)

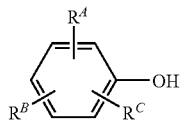

(III)

wherein $R^A$ represents linear or branched $C_1$-$C_{34}$-alkyl, $C_7$-$C_{34}$-alkylaryl, $C_6$-$C_{34}$-aryl or —COO—$R^D$, wherein $R^D$ represents hydrogen, linear or branched $C_1$-$C_{34}$-alkyl, $C_7$-$C_{34}$-alkylaryl or $C_6$-$C_{34}$-aryl, and $R^B$ and $R^C$ independently of one another are identical or different and represent hydrogen, linear or branched $C_1$-$C_{34}$-alkylaryl, $C_7$-$C_{34}$-alkylaryl or $C_6$-$C_{34}$-aryl.

Such monohydroxyaryl compounds are, for example, 1-, 2- or 3-methylphenol, 2,4-dimethylphenol, 4-ethylphenol, 4-n-propylphenol, 4-isopropylphenol, 4-n-butylphenol, 4-isobutylphenol, 4-tert-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenylethyl)-phenol, 4-phenylphenol, 4-phenoxyphenol, 4-(1-naphthyl)-phenol, 4-(2-naphthyl)phenol, 4-tritylphenol, methyl salicylate, ethyl salicylate, n-propyl salicylate, n-butyl salicylate, isobutyl salicylate, tert-butyl salicylate, phenyl salicylate and benzyl salicylate.

4-tert-Butylphenol, 4-isooctylphenol and 3-pentadecylphenol are preferred.

The monohydroxyaryl compound(s) are to be so chosen that their boiling point is above that of the monohydroxyaryl compound employed in the preparation of the diaryl carbonate that is used. The monohydroxyaryl compound can be added at any point in time during the reaction. It is preferably added at the beginning of the reaction. The amount of free monohydroxyaryl compound can be from 0.2 to 20 mol %, preferably from 0.4 to 10 mol %, based on the dihydroxyaryl compound.

It is additionally possible to change the end groups of the resulting polycarbonates also by addition of at least one additional diaryl carbonate whose base monohydroxyaryl compound has a higher boiling point than that of the base monohydroxyaryl compound of the diaryl carbonate mainly used. Here too, the additional diaryl carbonate can be added at any point in time during the reaction. It is preferably added at the beginning of the reaction. The amount of the diaryl carbonate having the higher boiling base monohydroxyaryl compound in the total amount of diaryl carbonate used can be from 1 to 40 mol %, preferably from 1 to 20 mol % and particularly preferably from 1 to 10 mol %.

The basic catalysts known in the literature, such as, for example, alkali and alkaline earth hydroxides and oxides and/or onium salts, such as, for example, ammonium or phosphonium salts, can be used as catalysts in the melt transesterification process for the preparation of polycarbonates. Preference is given to the use of onium salts, particularly preferably phosphonium salts, in the synthesis. Such phosphonium salts are, for example, those of the general formula (IV)

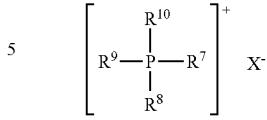

(IV)

wherein $R^{7-10}$ represent identical or different optionally substituted $C_1$-$C_{10}$-alkyl, $C_6$-$C_{14}$-aryl, $C_7$-$C_{15}$-arylalkyl or $C_5$-$C_6$-cycloalkyl radicals, preferably methyl or $C_6$-$C_{14}$-aryl, particularly preferably methyl or phenyl, and X— represents an anion selected from the group hydroxide, sulfate, hydrogen sulfate, hydrogen carbonate, carbonate, halide, preferably chloride, and alkylate or arylate of the formula —$OR^{11}$, wherein $R^{11}$ represents an optionally substituted $C_6$-$C_{14}$-aryl, $C_7$-$C_{15}$-arylalkyl or $C_5$-$C_6$-cycloalkyl radical, $C_1$-$C_{20}$-alkyl, preferably phenyl.

Particularly preferred catalysts are tetraphenylphosphonium chloride, tetraphenylphosphonium hydroxide and tetraphenylphosphonium phenolate, tetraphenylphosphonium phenolate being very particularly preferred.

The catalysts are preferably used in amounts of from $10^{-8}$ to $10^{-3}$ mol, particularly preferably in amounts of from $10^{-7}$ to $10^{-4}$ mol, based on one mole of dihydroxyaryl compound.

Co-catalysts can optionally also be used in order to increase the rate of the polycondensation.

These can be, for example, alkaline-reacting salts of alkali metals and alkaline earth metals, such as hydroxides, optionally substituted $C_1$-$C_{10}$-alkoxides and $C_6$-$C_{14}$-aryl oxides of lithium, sodium and potassium, preferably hydroxides, optionally substituted $C_1$-$C_{10}$-alkoxides or $C_6$-$C_{14}$-aryl oxides of sodium. Preference is given to sodium hydroxide, sodium phenolate or the disodium salt of 2,2-bis-(4-hydroxyphenyl)-propane.

If alkali or alkaline earth metal ions are supplied in the form of their salts, the amount of alkali or alkaline earth ions, determined, for example, by atom absorption spectroscopy, is from 1 to 500 part per billion ("ppb"), preferably from 5 to 300 ppb and most preferably from 5 to 200 ppb, based on polycarbonate to be formed. In preferred forms of the process according to the invention, however, no alkali salts are used.

Within the scope of the present invention, ppb and parts per million ("ppm") are to be understood as meaning parts by weight, unless indicated otherwise.

The alkaline-reacting salts of alkali metals and alkaline earth metals can be mixed in during the preparation of the oligocarbonates, that is to say at the beginning of the synthesis, or in a later process step, in order to suppress undesirable secondary reactions. The total amount of catalyst can also be added to the process in several steps.

It is her possible to add before the polycondensation, in addition to the catalysts and catalyst amounts already mentioned hereinbefore, supplementary amounts of onium catalysts. In the case where the above-mentioned catalyst is already an onium catalyst, the onium catalyst added in supplementary amounts before the polycondensation can be the same onium catalyst mentioned above or a different onium catalyst.

The addition of the catalysts is preferably carried out in solution in order to avoid harmful overconcentrations during metering. The solvents are preferably compounds that are inherent in the system and the process, such as, for example, the dihydroxyaryl compounds, diaryl carbonates or optionally monohydroxyaryl compounds that are employed. Monohydroxyaryl compounds are particularly suitable, because it is known to the person skilled in the art that the dihydroxyaryl compounds and diaryl carbonates readily begin to change and decompose even at slightly elevated temperatures, in particular under the action of a catalyst. The polycarbonate qualities can suffer as a result. In a particularly preferred form of the process according to the invention, the solvent for the catalyst is phenol. Phenol is particularly suitable in this form of the process according to the invention because the catalyst tetraphenylphosphonium phenolate that is preferably used in this form is isolated in its preparation in the form of mixed crystals with phenol.

The polycarbonates obtained by this process are distinguished structurally by the fact that, in addition to the chain ends capped by the phenols of formula (III), they also carry a particular proportion of uncapped phenolic end groups. This structural element can be described, for example, by the following formula (V)

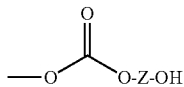

(V)

wherein Z has the meaning given for the general formula (I).

The content of phenolic OH end groups is preferably more than 150 ppm, particularly preferably more than 200 ppm, very particularly preferably more than 250 ppm (based on the weight of the polycarbonate), determined by infra spectroscopy.

The polycarbonates can be branched in a targeted manner by adding suitable branching agents to the reaction mixture. Suitable branching agents for the polycarbonate preparation are known to the person skilled in the art. They are compounds having three or more functional groups, preferably those having three or more hydroxyl groups.

Suitable compounds having three or more phenolic hydroxyl groups are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol and tetra-(4-hydroxyphenyl)-methane.

Other suitable compounds having three or more functional groups are, for example, 2,4-dihydroxybenzoic acid, trimesic acid, cyanuric chloride and 3,3-bis-(3-methyl-4-hydroxyphenyl)-2-oxo-2,3-dihydroindole.

Preferred branching agents are 3,3-bis-(3-methyl-4-hydroxyphenyl)-2-oxo-2,3-dihydroindole and 1,1,1-tri-(4-hydroxyphenyl)-ethane.

The branching agents are generally used in amounts of, for example, up to 3.6 mol %, preferably from 0.02 to 3.6 mol %, based on the dihydroxyaryl compound.

The dihydroxyaryl compounds, diaryl carbonates and monohydroxyaryl compounds that are used, as well as all the other raw materials, chemicals and auxiliary substances added to the synthesis, can be contaminated with impurities from their own synthesis, handling and storage and can be used without further purification. It is, however, desirable, but not absolutely necessary, to work with raw materials, chemicals and auxiliary substances that are as clean as possible.

The addition of at least one inhibitor is carried out before the last reaction stage. Within the scope of the invention, this means that the addition can take place in at least one reaction stage before the last reaction stage or between two reaction stages. This addition preferably takes place in the reaction stage immediately before the last reaction stage or between the penultimate and the last reaction stages.

Polycarbonates prepared by the melt transesterification process can contain catalytically active, basic impurities after their preparation. These can be on the one hand slight impurities of the starting substances that have not been separated off, basic residues of thermally decomposable catalysts that have not been separated off, or stable basic catalyst salts that have not been separated off. Thermally decomposable catalysts are to be understood as being, for example, the onium salts described above. Thermally stable catalysts are to be understood as being, for example, alkaline-reacting salts of the alkali or alkaline earth metals. In order to inhibit these catalytically active, basic impurities, specific inhibitors can be added to the polycarbonates in principle at different points in time in the respective processes.

Suitable inhibitors are acid components, such as Lewis or Brönstedt acids, or esters of strong acids. The pKa value of the inhibitor should not exceed 5 and should preferably be less than 3. The acid component, or esters thereof, is/are added in order to deactivate the above-mentioned basic impurities when the desired molecular weight is reached and hence, in an ideal case, bring the reaction to a halt. Such inhibitors are described, for example, in EP-A 1 612 231, EP-A 435 124 or DE-A 44 38 545.

Examples of suitable acid components are ortho-phosphoric acid, phosphorous acid, pyrophosphoric acid, hypophosphoric acid, polyphosphoric acids, benzenephosphonic acid, sodium dihydrogen phosphate, boric acid, arylboronic acids, hydrochloride acid (hydrogen chloride), sulfuric acid, benzenesulfonic acid, toluenesulfonic acid, dodecylbenzenesulfonic acid and all other phenyl-substituted benzenesulfonic acids, nitric acid, acid chlorides, such as chloroformic acid phenyl ester, acetoxy-BP-A, benzoyl chloride, as well as esters, semi-esters and bridged esters of the above-mentioned acids, such as, for example, toluenesulfonic acid esters, phosphoric acid esters, phosphorous acid esters, phosphonic acid esters, dimethyl sulfate, boric acid esters, arylboronic acid esters and other components that generate acids under the influence of water, such as tri-iso-octylphosphine, Ultranox 640 and BDP (bisphenol diphosphate oligomer).

Preference is given to the use of organic sulfur-containing acids, esters of organic sulfur-containing acids or mixtures thereof as inhibitors. The organic sulfur-containing acids can be, for example, benzenesulfonic acid, toluenesulfonic acid, trifluoromethanesulfonic acid, naphthalenesulfonic acid or sulfonated polystyrene. The esters of organic sulfur-containing acids can be, for example, dimethyl sulfonate, diethyl sulfonate, methyl, ethyl, propyl, butyl, octyl or phenyl esters of p-toluenesulfonic acid or benzenesulfonic acid. They can also be full or partial esters of polyhydric alcohols, such as, for example, glycerol tribenzenesulfonic acid ester, glycerol dibenzenesulfonic acid ester, glycerol monobenzenesulfonic acid ester, glycerol tri-p-toluenesulfonic acid ester, glycerol di-p-toluenesulfonic acid ester, glycerol mono-p-toluenesulfonic acid ester, ethylene glycol dibenzenesulfonic acid ester, ethylene glycol monobenzenesulfonic acid ester, ethylene glycol di-p-toluenesulfonic acid ester, ethylene glycol mono-p-toluenesulfonic acid ester, pentaerythritol tetrabenzenesulfonic acid ester, pentaerythritol tribenzenesulfonic acid ester, pentaerythritol dibenzenesulfonic acid ester, pentaerythritol monobenzenesulfonic acid ester, pentaerythritol tetra-p-toluenesulfonic acid ester, pentaerythritol tri-p-toluenesulfonic acid ester, pentaerythritol di-p-toluenesulfonic acid ester, pentaerythritol mono-p-toluenesulfonic acid ester, trimethylolpropane tribenzenesulfonic acid ester, trimethylolpropane dibenzenesulfonic acid ester, trimethylolpropane monobenzenesulfonic acid ester, trimethylolpropane tri-p-toluenesulfonic acid ester, trimethylolpropane di-p-toluenesulfonic acid ester, trimethylolpropane mono-p-toluenesulfonic acid ester, neopentyl glycol dibenzenesulfonic acid ester, neopentyl glycol monobenzenesulfonic acid ester, neopentyl glycol di-p-toluenesulfonic acid ester, neopentyl glycol mono-p-toluenesulfonic acid ester, and also mixtures thereof. These mixtures can additionally also contain residues of the starting compounds (acid component and/or alcohol component). Such inhibitors are also described, for example, without implying any limitation, in EP-A 1 609 818.

The described inhibitors can be added to the polymer melt individually or in any desired mixtures with one another or several different mixtures.

The inhibitors can be used in amounts of less than 100 ppm, based on the polycarbonate, preferably in amounts of from 0.1 to 50 ppm, based on the polycarbonate, particularly preferably from 0.5 to 10 ppm and very particularly preferably in amounts of from 1 to 5 ppm.

There is no limitation as regards the form of addition of the inhibitors. The inhibitors can be added to the polymer melt in the form of a solid, for example in the form of a powder, in solution or in the form of a melt. Another type of addition is the use of a masterbatch, that is to say a mixture of the inhibitor with the polymer, preferably with polycarbonate, which has been homogenised by means of compounding, which can also contain further additives, such as, for example, other stabilisers or mould release agents.

The esters of organic sulfur-containing acids are preferably added in liquid form. Because the amounts to be added are very small, solutions of the esters or masterbatches are preferably used.

The compounds chosen as solvents are preferably those which are already used as other components in the processes in question. Any residues that remain do not impair the quality, depending on the profile of requirements of the product that is to be produced.

Suitable compounds which have already been used in the process in question are preferably those which are chemically inert and evaporate quickly. Phenol or diphenyl carbonate, for example, are suitable as such compounds in preferred embodiments.

Suitable as further solvents are all organic solvents having a boiling point at normal pressure of from 30 to 300° C., preferably from 30 to 250° C. and particularly preferably from 30 to 200° C., as well as water—which also includes water of crystallisation.

Suitable solvents can be, for example, water or optionally substituted alkanes, cycloalkanes are aromatic compounds. The substituents can be aliphatic, cycloaliphatic or aromatic radicals in different combinations, as well as halogens or hydroxyl groups. Hetero atoms, such as, for example, nitrogen, can also be bridging members between aliphatic, cycloaliphatic or aromatic radicals, it being possible for the radicals to be identical or different. Further solvents can also be ketones and esters of organic acids as well as cyclic carbonates. It is also possible for the inhibitor to be dissolved in glycerol monostearate and metered in. Mixtures of the above-mentioned solvents can also be used as solvents.

Examples of such solvents, in addition to water, are n-pentane, n-hexane, n-heptane and isomers thereof, chlorobenzene, methanol, ethanol, propanol, butanol and isomers thereof, phenol, o-, m- and p-cresol, acetone, diethyl ether, dimethyl ketone, polyethylene glycols, polypropylene glycols, ethyl acetate, ethylene carbonate, propylene carbonate and mixtures thereof.

Water, phenol, propylene carbonate, ethylene carbonate, toluene and mixtures thereof are preferably suitable.

Water, phenol, propylene carbonate and mixtures thereof are particularly preferably suitable.

Static mixers or other dynamic mixers that result in homogeneous mixing, such as, for example, extruders, are suitable for effectively mixing in the inhibitor.

In or after the last reaction stage of the process according to the invention, one or more aromatic hydroxycarboxylic acid(s) or derivative(s) thereof are added to the reaction mixture. The addition is accordingly preferably carried out in the so-called finishing reactor or downstream of the finishing reactor, particularly preferably downstream of the finishing reactor.

No limitations exist with regard to the form in which the aromatic hydroxycarboxylic acid(s) or derivative(s) thereof are added. They can be added to the polymer melt in the form of a solid, e.g. a powder, in a dissolved form or as a melt. Another form of addition is the use of a masterbatch, i.e. a mixture of the hydroxycarboxylic acid(s) or derivative(s) thereof with the polymer, and preferably with polycarbonate. This masterbatch was homogenized by compounding; the polycarbonate used can contain other additives such as for example other stabilizers or mould-release agents. The aromatic hydroxycarboxylic acid or a derivative thereof can for example preferably be added with the aid of a lateral extruder to the polycarbonate melt in the form of a masterbatch in polycarbonate after the last reaction stage and before the discharge of the polymer and then dispersed further, optionally via other mixing devices such as static mixers. It is also possible for the polymer obtained in the final process step to be remelted in the form of granules, preferably in an extruder, where it is mixed with the aromatic hydroxycarboxylic acid(s) or derivative(s) thereof, preferably in the form of a masterbatch containing polycarbonate.

Derivatives of aromatic hydroxycarboxylic acids are to be understood as being, for example, esters, amides, halides or anhydrides of the corresponding acids, preferably esters of the corresponding acids, or carboxylic acids derivatized on the hydroxy group, such as, for example, alkoxycarboxylic acids or alkyloxycarbonyl- or aryloxycarbonyl-carboxylic acids.

Suitable aromatic hydroxycarboxylic acids or derivatives thereof are, for example, those of the general formula (VI), (VII) or (VIII)

(VI)

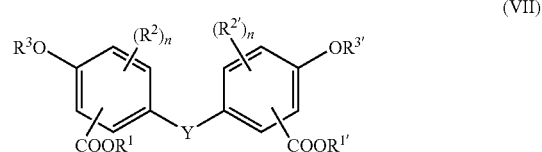

(VII)

-continued

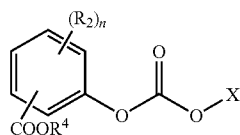

(VIII)

wherein

R¹ and R¹' independently of one another represent H or a linear, cyclic or branched $C_1$-$C_{10}$-alkyl, $C_6$-$C_{34}$-aralkyl radical or a linear, cyclic or branched $C_1$-$C_{10}$-hydroxyalkyl radical, preferably H or a linear or branched $C_1$-$C_6$-alkyl radical or a linear $C_1$-$C_6$-hydroxyalkyl radical, R² and R²' independently of one another represent a linear or branched $C_1$-$C_{10}$-alkyl, $C_6$-$C_{34}$-aralkyl radical, preferably a linear or branched $C_1$-$C_4$-alkyl radical, R³ and R³' independently of one another represent H, a linear or branched $C_1$-$C_{10}$-alkoxycarbonyl or $C_6$-$C_{34}$-arylcarbonyl radical, preferably H or a methylcarbonyl, ethylcarbonyl, propylcarbonyl, phenylcarbonyl, butylcarbonyl radical and very particularly preferably H or a methylcarbonyl radical, R⁴ represents H or a linear or branched $C_1$-$C_{10}$-alkyl, $C_6$-$C_{34}$-aralkyl radical or a linear or branched $C_1$-$C_{10}$-hydroxyalkyl radical, preferably H or a linear or branched $C_1$-$C_6$-alkyl radical or a linear $C_1$-$C_6$-hydroxyalkyl radical, l represents 1 or 2, preferably 1, n represents 0 or an integer from 1 to 3, preferably 0 or 1, m represents 1 or 2, preferably 1, Y represents a divalent radical consisting of from 1 to 8 carbon and/or hetero atoms, preferably —C(R⁵)(R⁶)—, —(CR⁵R⁶)$_m$—, —O—, —S—, —S(=O)—, —S(=O)$_2$—, —(C=O)—, —O—C(C=O)O—, —O—C(R⁵R⁶)O—, particularly preferably —C(R⁵)(R⁶)—, wherein R⁵ and R⁶ independently of one another represent a $C_1$-$C_{10}$-alkyl radical, preferably a $C_1$-$C_6$-alkyl radical, particularly preferably methyl, and X represents a $C_1$-$C_{10}$-alkyl, $C_1$-$C_{10}$-alkylphenyl or a phenyl radical, particularly preferably a phenyl radical.

Particularly preferred aromatic hydroxycarboxylic acids or derivatives thereof are, for example, 2,4-dihydroxybenzoic acid, 3,5-dihydroxybenzoic acid, 3,5-diisopropylsalicylic acid, 5,5-methylenedisalicylic acid, salicylic acid, acetylsalicylic acid, salicylic acid methyl ester, salicylic acid 2-ethylhexyl ester and salicylic acid n-butyl ester.

The aromatic hydroxycarboxylic acids or derivatives thereof are used in or after the last reaction stage of the process according to the invention in amounts of, for example, from 5 to 500 ppm, preferably from 10 to 300 ppm, particularly preferably from 20 to 200 ppm, based on the polycarbonate.

By means of this combination of the addition of at least one inhibitor in a reaction stage before the last reaction stage and the addition of at least one aromatic hydroxycarboxylic acid or derivative thereof in the last reaction stage, it is possible by means of the melt transesterification process to obtain polycarbonates which, on further processing, for example by means of injection moulding, yield mouldings having a low electrostatic charge on the surface. Such a combination of inhibitors and additional aromatic hydroxycarboxylic acids or derivatives thereof in this specific time sequence within the process has not hitherto been described in the literature. The effect of the low electrostatic charge on the surface of the resulting moulded bodies or extrudates is all the more surprising because, for example, the addition of inhibitors of the above-mentioned type before the finishing reactor is already known (see e.g. EP-A 1 612 231 and DE-A 103 57 161) but does not have any positive effect on the electrostatic properties of the resulting moulded bodies or extrudates.

The process according to the invention can be carried out either discontinuously or continuously.

Once the dihydroxyaryl compounds and diaryl carbonates, optionally with further compounds, such as, for example, a higher boiling monohydroxyaryl compound, are present in the form of a melt, the reaction is started in the presence of at least one suitable catalyst.

The conversion, or the molecular weight, is increased, with rising temperatures and falling pressures, in suitable apparatuses and devices, by conveying away the monohydroxyaryl compound that is separated off, until the desired final state, that is to say the desired conversion or molecular weight, is reached. The nature and concentration of the end groups are formed by the choice of the ratio of dihydroxyaryl compound to diaryl carbonate, the rate of loss of the diaryl carbonate via the vapours and optionally added further compounds, such as, for example, a higher boiling monohydroxyaryl compound, which is given by the choice of procedure or installation for the preparation of the polycarbonate.

Within the scope of the invention, $C_1$-$C_4$-alkyl represents, for example, methyl, ethyl, n-propyl, isopropyl, n-butyl, sec-butyl, tert-butyl, $C_1$-$C_6$-alkyl additionally represents, for example, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl or 1-ethyl-2-methylpropyl, $C_1$-$C_{10}$-alkyl additionally represents, for example, n-heptyl and n-octyl, pinacyl (organic alkyl-rest of the pinacol molecule), adamantyl, the isomers of menthyl, n-nonyl, n-decyl, $C_1$-$C_{34}$-alkyl additionally represents, for example, n-dodecyl, n-tridecyl, n-tetradecyl, n-hexadecyl or n-octadecyl. The same is true for the corresponding alkyl radical, for example, in aralkyl or alkylaryl, alkylphenyl or alkylcarbonyl radicals. Alkylene radicals in the corresponding hydroxyalkyl or aralkyl or alkylaryl radicals represent, for example, the alkylene radicals corresponding to the above alkyl radicals.

Aryl represents a carbocyclic aromatic radical having from 6 to 34 structural carbon atoms. The same is true of the aromatic portion of an arylalkyl radical, also called aralkyl radical, as well as of aryl constituents of more complex groups, such as, for example, arylcarbonyl radicals.

Examples of $C_6$-$C_{34}$-aryl are phenyl, o-, m-, p-tolyl, naphthyl, phenanthrenyl, anthracenyl or fluorenyl.

Arylalkyl or aralkyl, each independently, denote a straight-chained, cyclic, branched or unbranched alkyl radical according to the above definition, which can be monosubstituted, polysubstituted or wholly substituted by aryl radicals according to the above definition.

The above lists are to be interpreted by way of example, without implying any limitation.

There is in principle no limitation or restriction in respect of the manner in which, the installation in which and the procedure according to which the process is carried out. The process can preferably be carried out in the manner described hereinbelow.

Furthermore, there is no particular limitation or restriction as regards the temperatures and pressures for the process according to the invention. Any condition is possible, provided that the chosen temperatures, pressures and catalysts permit melt transesterification with appropriately rapid removal of the monohydroxyaryl compound that is separated off.

The temperatures throughout the entire process are generally from 180 to 300° C., and the pressures are from 15 bar, absolute to 0.01 mbar, absolute.

A continuous procedure is preferably chosen, because this can be advantageous for the product quality.

Such a continuous process according to the invention is preferably carried out as follows: one or more dihydroxyaryl compounds are preferably subjected to preliminary condensation with one or more diaryl carbonate(s) and optionally further reactants using at least one catalyst, and after this preliminary condensation the molecular weight of the final product is built up to the desired level, without separating off the monohydroxyaryl compound(s) formed, in a plurality of subsequent reaction-evaporator stages, with temperatures that increase stepwise and pressures that fall stepwise.

The devices, apparatuses and reactors suitable for the individual reaction-evaporator stages are, according to the procedure, heat exchangers, pressure-relieving apparatuses, separators, columns, evaporators, stirred vessels and reactors or other commercial apparatuses which provide the necessary residence time at chosen temperatures and pressures. The chosen devices must permit the necessary introduction of heat and must be so constructed that they conform to the continuously increasing melt viscosities.

All the devices are connected to one another via pumps, pipes and valves. The pipes between all the devices must, of course, be as short as possible and the number of bends in the pipes must be kept as small as possible in order to avoid unnecessarily lengthened residence times. The external, that is to say technical, marginal conditions and concerns for assemblies of chemical installations are to be taken into account.

For carrying out the process according to a preferred continuous procedure, either the reactants can be melted together or the solid dihydroxyaryl compound(s) can be dissolved in the diaryl carbonate melt or the solid diaryl carbonate(s) can be dissolved in the melt of the dihydroxyaryl compound(s), or the two raw materials are brought together in melt form, preferably directly from their preparation. The residence times of the separate melts of the raw materials, in particular of the melt of the dihydroxyaryl compound, are as short as possible. The mixture of melts, on the other hand, can be left for a longer period at correspondingly lower temperatures without losses of quality owing to the lower melting point of the raw material mixture as compared with that of the individual raw materials.

Thereafter, the catalyst(s), preferably dissolved in a suitable solvent, such as, for example, phenol, is/are added and the melt is heated to the reaction temperature.

In preferred forms of the process according to the invention, a partial stream is removed from the melt stream, by means of a gear pump, between the penultimate reactor and the finishing reactor, and at least one inhibitor is metered into the partial stream. Immediately thereafter, the mixture is pumped back into the main stream via a static mixer for intensive mixing. Downstream of the entry point in the direction of flow there is a further static mixer which ensures homogeneous distribution in the main melt stream, which is then passed into the final reactor. In the final reactor, which is used for residual monomer reduction, the residual monomers are reduced at temperatures of from 260 to 310° C., preferably at from 265 to 300° C. and particularly preferably at from 270 to 290° C., and at pressures of from 0.01 to 3 mbar, preferably from 0.2 to 2.5 mbar and particularly preferably from 0.4 to 2 mbar. The filling levels in the final reactor are as low as technically possible in terms of the process. The residence time in the final reactor—which is also called the finishing reactor—is of the order of from several minutes to hours, preference being given to from 5 to 180 minutes, particularly preferably from 10 to 150 minutes and very particularly preferably from 15 to 120 minutes. A slight molecular weight increase which may occur in the end reactor, in which the residual monomers are predominantly to be evaporated off, can be compensated for by lowering the inlet molecular weight to such a degree that the desired final molecular weight is achieved exactly after the residual monomers have been evaporated off. The finished polycarbonate is discharged from the final reactor by means of a pump device and, if necessary, is provided, by known processes, with additives for improving its properties; it is drawn off in the form of an extrudate, cooled and granulated. A gear pump is generally used as the pump device. Alternatively, screws of very different constructions or displacement pumps of special construction can be used.

The particularly preferred form of the process according to the invention, in which, for example, 2,2-bis-(4-hydroxyphenyl)-propane (bisphenol A, BPA) and diphenyl carbonate (DPC) are reacted with one another to give polycarbonate, is described by way of example hereinbelow, without implying any limitation:

The reaction temperature at the beginning of this particularly preferred form is from 180 to 220° C., preferably from 190 to 210° C., very particularly preferably 190° C. In the case of residence times of from 15 to 90 minutes, preferably from 30 to 60 minutes, the reaction equilibrium is established without the hydroxyaryl compound that forms being removed. The reaction can be conducted at atmospheric pressure but also, for technical reasons, under excess pressure. The preferred pressure in industrial installations is from 2 to 15 bar absolute.

The melt mixture is relieved into a first vacuum chamber, the pressure of which is adjusted to from 100 to 400 mbar, preferably from 150 to 300 mbar, and immediately thereafter is heated to the inlet temperature again in a suitable device, at the same pressure. During the relief operation, the hydroxyaryl compound that forms is evaporated off with any monomers still present. After a residence time of from 5 to 30 minutes in a sump receiver, optionally with recirculation by pumping at the same pressure and temperature, the reaction mixture is relieved into a second vacuum chamber, the pressure of which is from 50 to 200 mbar, preferably from 80 to 150 mbar, and immediately thereafter is heated in a suitable device, at the same pressure, to a temperature of from 190 to 250° C., preferably from 210 to 240° C., particularly preferably from 210 to 230° C. Here too, the hydroxyaryl compound that forms is evaporated off with any monomers still present. After a residence time of from 5 to 30 minutes in a sump receiver, optionally with recirculation by pumping, at the same pressure and temperature, the reaction mixture is relieved into a third vacuum chamber, the pressure of which is from 30 to 150 mbar, preferably from 50 to 120 mbar, and immediately thereafter is heated in a suitable device, at the same pressure, to a temperature of from 220 to 280° C., preferably from 240 to 270° C., particularly preferably from 240 to 260° C. Here too, the hydroxyaryl compound that forms is evaporated off with any monomers still present. After a residence time of from 5 to 20 minutes in a sump receiver, optionally with recirculation by pumping at the same pressure and temperature, the reaction mixture is relieved into a further vacuum chamber, the pressure of which is from 5 to 100 mbar, preferably from 15 to 100 mbar, particularly preferably from 20 to 80 mbar, and immediately thereafter is heated in a suitable device, at the same pressure, to a temperature of from 250 to 300° C., preferably from 260 to 290° C., particularly preferably from 260 to 280° C. Here too, the hydroxyaryl compound that forms is evaporated off with any monomers still present.

The number of these stages, which in the present case is 4, for example, can vary between 2 and 6. If the number of stages is changed, the temperatures and pressures are to be adapted accordingly in order to obtain comparable results. The relative viscosity of the oligomeric carbonate that is achieved in these stages is from 1.04 to 1.20, preferably from 1.05 to 1.15, particularly preferably from 1.06 to 1.10.

After a residence time of from 5 to 20 minutes in a sump receiver, optionally with recirculation by pumping at the same pressure and temperature as in the last flash/evaporator stage, the oligocarbonate so produced is fed to a disk or basket reactor and is condensed further at from 250 to 310° C., preferably from 250 to 290° C., particularly preferably from 250 to 280° C., at pressures of from 1 to 15 mbar, preferably from 2 to 10 mbar, with residence times of from 30 to 90 minutes, preferably from 30 to 60 minutes. The product reaches a relative viscosity of from 1.12 to 1.28, preferably from 1.13 to 1.26, particularly preferably from 1.13 to 1.24.

The melt leaving this reactor is brought to the desired final viscosity or final molecular weight in a further disk or basket reactor. The temperatures are from 270 to 330° C., preferably from 280 to 320° C., particularly preferably from 280 to 310° C., and the pressure is from 0.01 to 3 mbar, preferably from 0.2 to 2 mbar, with residence times of from 60 to 180 minutes, preferably from 75 to 150 minutes. The relative viscosities are adjusted to the level necessary for the intended application and are from 1.18 to 1.40, preferably from 1.18 to 1.36, particularly preferably from 1.18 to 1.34.

The polycarbonate so obtained ideally contains less than 350 ppm diphenyl carbonate (DPC), less than 40 ppm 2,2-bis-(4-hydroxyphenyl)-propane (BPA) and less than 150 ppm phenol, preferably less than 300 ppm DPC, less than 30 ppm BPA and less than 100 ppm phenol, particularly preferably less than 250 ppm DPC, less than 20 ppm BPA and less than 80 ppm phenol, and especially particularly preferably less than 200 ppm DPC, less than 15 ppm BPA and less than 70 ppm phenol.

The function of the two basket reactors can also be combined in one basket reactor.

The vapours from all the process stages are immediately drawn off, collected and worked up. This working up is generally carried out by distillation, in order to achieve high purities of the recovered substances. This can be carried out, for example, according to DE-A 10 100 404. From an economic and ecological point of view, recovery and isolation of the monohydroxyaryl compound that has been separated off in highly pure form is obvious. The monohydroxyaryl compound can be used directly in the preparation of a dihydroxyaryl compound or of a diaryl carbonate.

The disk or basket reactors are distinguished by the fact that, with long residence times, they provide in the vacuum a very large surface area that is constantly renewed. In terms of geometry, the disk or basket reactors are formed according to the melt viscosities of the products. There are suitable, for example, reactors as described in DE 44 47 422 C2 and EP-A 1 253 163, or twin-shaft reactors as described in WO-A 99/28 370.

The above-described particularly preferred form of the process according to the invention can also be to the reaction of dihydroxyaryl compounds or diaryl carbonates other than 2,2-bis-(4-hydroxyphenyl)-propane (bisphenol A, BPA) and diphenyl carbonate (DPC). Adaptations of the temperature and pressure settings in the individual process stages may optionally be necessary.

The oligocarbonates, including oligocarbonates of very low molecular weight, and the finished polycarbonates are generally conveyed by means of gear pumps, screws of different types or displacement pumps of a special type.

Particularly suitable materials for the production of the apparatuses, reactors, pipes, pumps and fittings are stainless steels of the Cr Ni (Mo) 18/10 type, such as, for example, 1.4571 or 1.4541 (Stahlschlüssel 2001, Verlag: Stahlschlüssel Wegst GmbH, Th-Heuss-Straße 36, D)-71672 Marbach) and Ni-based alloys of type C, such as, for example, 2.4605 or 2.4610 (Stahlschlüssel 2001, Verlag: Stahlschlüssel Wegst GmbH, Th-Heuss-Straße 36, D-71672 Marbach). Stainless steels are used at process temperatures up to about 290° C., and Ni-based alloys are used at process temperature above about 290° C.

The important process parameters, such as the ratio of diaryl carbonate to dihydroxyaryl compound at the beginning of the process, the pressure, temperature and residence time, are to be so chosen throughout the entire installation, before the final or finishing reactor, that a molecular weight and specific OH end group contents adequate for the intended application of the product to be produced are achieved before the reaction melt enters the final or finishing reactor. The final molecular weight is dependent substantially on the chosen outlet temperature of the reactor, the pressure and the OH end group concentration. These conditions are therefore to be so chosen in the penultimate reactor that the desired end product can be produced. The mean weight-average molecular weight $M_w$ is so adjusted that a $M_w$ not exceeding 40,000 g/mol, preferably not exceeding 36,000 g/mol and particularly preferably not exceeding 30,000 g/mol is achieved. The content of OH end groups in the polycarbonates is preferably above 150 ppm, particularly preferably above 200 ppm, very particularly preferably above 250 ppm. Particular preference is given to an OH end group content of from 150 to 750 ppm, preferably from 150 to 600 ppm, particularly preferably from 200 to 550 ppm and very particularly preferably from 250 to 500 ppm.

In order to obtain a low content of residual monomers, the melt is to be mixed intensively with at least one of the above-mentioned suitable inhibitors before the finishing reactor, preferably between the penultimate and the final reactor, or before a degassing apparatus, in order to stop the reaction. The monomers can subsequently be evaporated off in the finishing reactor (or degassing apparatus).

The polycarbonate prepared by the process according to the invention is suitable in particular for optionally rewritable optical data carriers having good coatability and wettability as well as a low tendency to contamination. In addition, few deposits occur on tools or on the corresponding mouldings or extrudates during the processing of the polycarbonate to mouldings or extrudates.

The polycarbonate prepared by the process according to the invention is additionally suitable for the production of injection-moulded articles which have surprisingly low values for the electric field strength. For injection-moulded articles produced by means of known injection-moulding processes without the use of ionisers, values for the electric field strength in an acceptable range of from −18 kV/m to +18 kV/m can be achieved, for example.

Such polycarbonates have hitherto not been available by melt transesterification processes and have not been described in the literature.

The invention therefore also provides the polycarbonates prepared from the processes according to the invention.

These polycarbonates preferably have a content of phenolic OH end groups of more than 150 ppm, preferably more than 200 ppm, particularly preferably more than 250 ppm.

The amount of OH end groups can be determined by NMR measurement, IR measurement or by on-line IR measurement of the OH end groups. Determination of the OH end groups can also be carried out by photometry. The IR method and the photometric method is described in Horbach, A.; Veiel, U.; Wunderlich, H., Makromolekulare Chemie 1965, Volume 88, p. 215-231. The values given within the scope of the invention for the content of phenolic OH groups were determined by means of IR measurement.

Injection-moulded bodies of conventional polycarbonate prepared by the melt transesterification process have the property of building up high electric fields on the surface of the injection-moulded articles. Thus, for example, disks for optical data storage media made from this polycarbonate build up a high electric field during their production by the injection-moulding process. During the production of the optical data storage media, this high field strength on the substrate leads, for example, to dust being attracted from the environment or to the injection-moulded articles, for example the disks, sticking together, which reduces the quality of the finished injection-moulded articles and additionally renders the injection-moulding process more difficult.

Furthermore, the electrostatic charging in particular of disks (for optical data carriers) leads to a lack of wettability especially with non-polar media, such as, for example, a non-polar dye or a dye application from solvents, such as, for example, dibutyl ether, ethylcyclohexane, tetrafluoropropanol, cyclohexane, methylcyclohexane or octafluoropropanol. For example, a high electrical charge on the surface of the substrate during dye application in the case of writable data storage media leads, for example, to irregular and incomplete coating with dye and accordingly results in defects in the information layer.

It has been shown that the polycarbonates according to the invention are particularly suitable for yielding injection-moulded articles which do not exceed a particular electric field strength, measured at a defined distance from the substrate surface and at a defined temperature and humidity, after a particular production period. In order to achieve acceptable coating behaviour, it is desirable that ±18 kV/m is not exceeded after 2 hours of a continuous injection-moulding process. The values achieved for the polycarbonates according to the invention are preferably from −18 to +18 kV/m after 2 hours of a continuous injection-moulding process. The value of the electric field strength is generally established within a period of one hour and only changes slightly, or not at all, thereafter per unit time. The above-mentioned values of the electric field strength for substrate materials according to the invention can additionally be achieved without the use of ionisers, so that the use of ionisers can be largely reduced during the further processing of the polycarbonates.

An injection-moulded body of polycarbonate, such as, for example, an optical disk, having the above-mentioned properties in respect of the electric field strength, is distinguished by good coatability with dyes. This is important to ensure fault-free application of the writable layer and accordingly a trouble-free production process. This results in a markedly reduced reject rate as compared with conventional substrate materials.

The electric field strength, caused by surface charges on the corresponding substrate, is dependent on the geometry and dimensions of the injection-moulded body and the nature of the injection-moulding process. Therefore, it is necessary to measure the electric field strength on a finished injection-moulded body, such as, for example, a disk for an optical data carrier.

The low values for the electric field strength are particularly surprising in the light of the relatively high content of phenolic OH groups in the polycarbonates according to the invention.

The weight-average molecular weight of the polycarbonate is generally $M_w$=from 10,000 to 40,000 g/mol, preferably from 15,000 to 36,000 g/mol and particularly preferably from 18,000 to 35,000 g/mol. The weight average of the molecular weight is thereby determined by way of the limiting viscosity according to the Mark-Houwink correlation (G. V. Schulz, H. Horbach, *Makromol. Chem*, 1959, 29, 93). The limiting viscosity is obtained when the viscosity of a polycarbonate solution in methylene chloride at 25° C. is determined by means of an Ubbelohde capillary viscometer in accordance with DIN EN ISO 1628. By means of the Mark-Houwink equation, the weight average of the molecular weight for polycarbonate is obtained according to $[\eta]=K \times M_w^\alpha$ ($[\eta]$: limiting viscosity; K: $11.1 \times 10^{-3}$ ml/g; α: 0.82).

The polycarbonates additionally preferably have an extremely low content of salt-like impurities. The amount of alkali or alkaline earth ions resulting from salt-like impurities, determined by atom absorption spectroscopy, should be less than 60 ppb, preferably less than 40 ppb and particularly preferably less than 20 ppb. The salt-like impurities can originate, for example, from impurities from the raw materials used and the phosphonium and ammonium salts. Further ions such as Fe, Ni, Cr, Zn, Sn, Mo, Al ions and their homologues can be contained in the raw materials or can originate by abrasion or corrosion from materials of the installation used. The sum total of these ions is less than 2 ppm, preferably less than 1 ppm and particularly preferably less than 0.5 ppm.

There are present as anions those of inorganic acids and organic acids in equivalent amounts (e.g. chloride, sulfate, carbonate, phosphate, phosphite, oxalate, etc.).

Very small amounts of such cations and anions are desirable, and it is therefore advantageous to use raw materials that are as pure as possible. Such pure raw materials can be obtained from the partly contaminated industrial raw materials, for example, by additional purification operations before their use, such as, for example, by recrystallisation, distillation, precipitation with washing and the like.

The polycarbonate according to the invention can also be provided with further, conventional additives and added substances (e.g. auxiliary substances and reinforcing substances) for the purpose of changing properties. The addition of additives and added substances serves to lengthen the useful life (e.g. hydrolysis or degradation stabilisers), to improve colour stability (e.g. heat and UV stabilisers), to simplify processing (e.g. mould release agents, flow improvers), to improve the properties in use, to improve flame resistance, to influence the visual impression (e.g. organic colourings, pigments) or to adapt the properties of the polymers to particular stresses (impact modifiers, finely divided minerals, fibrous materials, quartz flour, glass fibres and carbon fibres). Such added substances and additives are described, for example, in "plastics Additives", R. Gächter and H. Müller, Hanser Publishers 1983.

The amounts of flameproofing agents, mould release agents, UV stabilisers, heat stabilisers are chosen in the manner known to the person skilled in the art for aromatic polycarbonates. However, for the reasons described at the beginning, the amount of additives used must be kept as small as possible. Examples of such additives are mould release agents based on stearic acid and/or stearic alcohol, particularly preferably pentaerythritol stearate, trimethylolpropane tristearate, pentaerythritol distearate, stearyl stearate and glycerol monostearate, as well as conventional heat stabilisers.

In order to achieve the desired properties, the different additives can be combined with one another. These additives and added substances can be added to the polymer melt individually or in any desired mixtures or in a plurality of different mixtures, either directly during isolation of the polymer or after the melting of granules in a so-called compounding step.

The additives and added substances, or mixtures thereof, can be added to the polymer melt in the form of a solid, that is to say in the form of a powder, or in the form of a melt. Another type of metering is the use of masterbatches, that is to say a mixture of the additive or added substance with the polymer, preferably with polycarbonate, which has been homogenised by compounding, or mixtures of masterbatches of the additives or additive mixtures.

The addition of these substances is preferably carried out in conventional devices to the finished polycarbonate.

Suitable additives are described, for example, in Additives for Plastics Handbook, John Murphy, Elsevier, Oxford 1999 or Plastics Additives Handbook Hans Zweifel, Hanser, Munich 2001.

The polycarbonates according to the invention are outstandingly suitable as substrate materials for transparent injection-moulded parts, in particular for injection-moulded parts that are to be coated, such as, for example, transparent sheets, lenses, optical storage media or carriers for optical storage media, or articles from the automotive glazing sector, such as, for example, light-diffusing plates. It is accordingly possible to produce from the polycarbonate according to the invention in particular optical storage media or carriers for optical storage media, such as, for example, writable optical data storage media, which have good coatability and wettability and are suitable, for example, for the application of dyes from solution, in particular from non-polar media. In addition, the optical injection-moulded parts produced from these polycarbonates have a lower tendency to contamination.

The invention therefore also provides mouldings or extrudates produced from the polycarbonates according to the invention, such as, for example, disks for writable optical data storage means or materials from the automotive glazing sector, such as, for example, light-diffusing plates.

The examples which follow serve to illustrate the invention by way of example, without implying any limitation.

EXAMPLES

Relative Solution Viscosity

The relative solution viscosity was determined in dichloromethane at a concentration of 5 g/l at 25° C.

Content of Phenolic OH End Groups:

The content of phenolic OH end groups was obtained by IR measurement. For this purpose, a differential measurement of a solution of 2 g of polymer in 50 ml of dichloromethane compared with pure dichloromethane was carried out, and the difference in extinction at 3582 cm$^{-1}$ was determined.

Coating Test:

The coating test simulates the behaviour of the corresponding material in the injection-moulding process in respect of coating formation. The coating test was carried out as follows:

20 g of polymer granules were dried for 4 hours at 120° C. and then placed in a small aluminium dish having a diameter of 80 mm. The small dish was then placed in a metal block which had a circular recess with a diameter of 85 mm and a depth of 50 mm, the metal block already having been heated electrically to 300° C.

The recess in the metal block was covered with a 0.03 mm thick aluminium foil, and a coolable metal block was in turn applied from the rear side. This metal block is provided with cooling channels through which water at an approximate temperature of 20° C. flows.

During the measuring time, which is 4 hours, volatile constituents evaporating out of the granules condense on the aluminium foil. When carrying out the measurement it must be ensured that the aluminium foil effectively seals the sample chamber to the outside.

The test apparatus was subsequently cooled down to ambient temperature, When ambient temperature had been reached, the aluminium foil was removed and weighed on a microbalance. The amount of condensate was determined from the difference in the weight of the foil before and after the test. The coating value is the weight of the coating precipitated on the foil relative to the original weight of the granules, in percent.

Measurement of the Electric Field Strength:

The influence of the process according to the invention was checked by means of measurements of the electric field strength on finished injection-moulded parts, in the present case on disks. The following injection-moulding parameters and conditions were established for the production of these optical disks:

Machine: Netstal Discjet
Matrix: audio stamper
Cycle time: 4.4 s
Temperature of the composition: 310-33 0° C.
Substrate dimensions: audio CD
Tool temperature, matrix side: 60° C.

Before the start of the injection-moulding process, a new audio stamper was inserted into the machine. Before the new stamper was inserted, the entire injection-moulding installation was cleaned of previous material so that the measured values were not falsified.

The electric field strength was measured using a field meter from Eltec (EMF 581230). Immediately after the end of the injection-moulding process, the disk was removed by means of a robot arm and deposited. The disk was not allowed to come into contact with metal, because otherwise the measurement is impaired. Furthermore, any ionisers present had to be switched off.

The field meter was positioned above the disk at a distance of 100 mm from the horizontal disk surface. The distance of the field meter from the inside edge of the disk was 29 mm and was oriented centrally over the writable surface. The disk was not moved. Measurement of the field accordingly took place within a period of from 3 to 10 seconds following completion of the injection-moulding process.

The measuring device was connected to an x/y plotter, on which the values were printed out. A particular integral value of the electric field was accordingly assigned to each measured disk. In order to limit the amount of data, 100 measurements were carried out after the start of the process, that is to say the corresponding electric field strength on the surface of the first 100 disks was recorded. After in each case 60 minutes, a further 100 measurements were carried out. After the 3rd series of measurements, that is to say after about 2 hours, the measurement was stopped.

When carrying out the measurement it was additionally to be ensured that the humidity during the measurement was from 20 to 50% and the room temperature was from 22 to 28° C.

Example 1

Comparison Example

From a receiver, 7500 kg/h of melt mixture comprising 3741 kg/h of diphenyl carbonate (17.45 kmol/h) and 3759 kg/h of bisphenol A (16.47 kmol/h), with addition of 4.19 kg/h of a catalyst mixture, were pumped through a heat exchanger, heated to 190° C. and guided through a residence column at 12 bar and 190° C. The mean residence time was 50 minutes. The catalyst mixture consisted of 0.52 kg of the phenol adduct of tetraphenylphosphonium phenolate (containing 65.5 wt. % tetraphenylphosphonium phenolate 0.786 mol) dissolved in 4.5 kg of phenol.

The melt was then passed via a relief valve into a separator under a pressure of 200 mbar. The melt flowing off was heated to 200° C. again in a falling film evaporator, which was likewise under a pressure of 200 mbar, and collected in a receiver. After a residence time of 20 minutes, the melt was pumped into the next three stages, which were of identical construction. The pressure, temperature and residence time conditions in the 2nd/3rd/4th stage were 90/70/40 mbar; 223/252/279° C. and 20/10/10 minutes. All the vapours were guided via pressure regulators into a column under vacuum and discharged in the form of condensates.

The oligomer was then condensed in a subsequent basket reactor at 280° C. and 4.7 mbar, with a residence time of 45 minutes, to give a higher molecular weight product whose relative viscosity was 1.195. The vapours were condensed.

A partial stream of 150 kg/h melt was diverted from the melt stream, which was guided into a further basket reactor, by means of a gear pump; 2.0 g/h of 1,2,3-propanetriol tris(4-benzenesulfonate) were added to the partial stream, and the mixture was guided via a static mixer having a length-to-diameter ratio of 20 and passed back into the main melt stream. Directly after coming together, the 1,2,3-propanetriol tris(4-benzenesulfonate) was distributed homogeneously throughout the melt stream by means of a further static mixer. The melt so treated was exposed further to the process conditions in a further basket reactor at 294° C., 0.7 mbar and with a mean residence time of 130 minutes, discharged and granulated. 250 ppm of glycerol monostearate, which is used as a mould-release agent, were then added in liquid form to the melt, as well as 50 ppm of tris(2-ethyl-hexyl)phosphate (CAS: 78-42-2) as a thermostabilizer, and the melt was then discharged and granulated.

The production of the optical mouldings (disks) and the measurement of the electric field strength were carried out as described above. To this end, the resulting granules were dried for 6 hours and then processed to disks by means of a Netstal Discjet injection-moulding machine (see above) at a cycle time of 4.4 seconds under the parameters indicated above. An audio stamper was used as the matrix. The electric field of the first 100 disks was measured as described above using a field meter. After one hour, a further 100 disks were measured in succession; the injection-moulding process was not interrupted. After a further hour, 100 disks were likewise measured in succession. For evaluation, the measured values of the last 100 disks after 2 hours' continuous injection-moulding process were used.

The mean value of the electric field strength of the last 100 disks (after 2 hours' injection-moulding process) was −25.0 kV/m.

The coating test gave a condensate of 0.0967 wt. %.

Content of phenolic OH groups: 470 ppm

The limiting viscosity of the polymer is 36.5. This corresponds to a molecular weight of approximately $M_W=19,450$ g/mol.

Example 2

Comparison Example

The procedure of Example 1 was followed, with the difference that 2 ppm of 1,2,3-propanetriol tris(4-benzenesulfonate) was added before the finishing reactor. In addition, unlike in Example 1, a further 10 ppm of 1,2,3-propanetriol tris(4-benzenesulfonate) were added to the material after the last basket reactor, that is to say the last process step. The mixture was then spun off and granulated.

The production of the disks and the measurement of the electric field strength were carried out as described above.

The mean value of the electric field strength of the last 100 disks (after 2 hours' injection-moulding process) was −24.6 kV/m.

The coating test gave a condensate of 0.0957 wt. %.

Content of phenolic OH groups: 500 ppm

The limiting viscosity of the polymer is 35.4. This corresponds to a molecular weight of approximately $M_w=18,740$ g/mol.

Example 3

According to the Invention

The procedure of Example 1 was followed, with the difference that 300 ppm of salicylic acid was added to the material after the last basket reactor, that is to say the last process step. The mixture was then spun off and granulated.

The production of the disks and the measurement of the electric field strength were carried out as described above.

The mean value of the electric field strength of the last 100 disks (after 2 hours' injection-moulding process) was −15.8 kV/m.

The coating test gave a condensate of 0.0974 wt. %.

Content of phenolic OH groups: 470 ppm

The limiting viscosity of the polymer is 36.3. This corresponds to a molecular weight of approximately $M_w=119,320$ g/mol.

Example 4

According to the Invention

The procedure of Example 1 was followed, with the difference that 100 ppm of acetylsalicylic acid was added to the material after the last basket reactor, that is to say the last process step. The mixture was then spun off and granulated.

The production of the disks and the measurement of the electric field strength were carried out as described above.

The mean value of the electric field strength of the last 100 disks (after 2 hours' injection-moulding process) was −11.1 kV/m.

The coating test gave a condensate of 0.089 wt. %.

Content of phenolic OH groups: 470 ppm

The limiting viscosity of the polymer is 36.1. This corresponds to a molecular weight of approximately $M_w$=19,190 g/mol.

Example 5

According to the Invention

The procedure of Example 1 was followed, with the difference that 300 ppm of acetylsalicylic acid was added to the material after the last basket reactor, that is to say the last process step. The mixture was then spun off and granulated.

The production of the disks and the measurement of the electric field strength were carried out as described above.

The mean value of the electric field strength of the last 100 disks (after 2 hours' injection-moulding process) was +9.0 kV/m.

The coating test gave a condensate of 0.0963 wt. %.

Content of phenolic OH groups: 460 ppm

The limiting viscosity of the polymer is 36.0. This corresponds to a molecular weight of approximately $M_w$=19,130 g/mol.

The preceding examples according to the invention surprisingly show a markedly lower electrostatic charge as compared with the comparison examples and, despite additional additives, comparably low deposits on the disks.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

Example 6

According to the Invention

The same procedure was used as in Example 1, except that, after the final basket reactor, i.e. the last process step, 100 ppm of 5,5-methylenebis(salicylic acid) were added to the material. Then the material was spun off and granulated.

The production of the discs and the measurement of the electric field strength were carried out as described above.

The average value for the electric field strength of the last 100 discs (after 2 hours of the injection moulding process) was +10.0 kV/m.

The invention claimed is:

1. A process for the preparation of a polycarbonate which comprises a melt transesterification process, which comprises reacting at least one dihydroxyaryl compound in a multi-stage process with at least one diaryl carbonate using at least one catalyst, wherein at least one inhibitor is added to the melt before the last reaction stage, and one or more aromatic hydroxycarboxylic acids or derivatives thereof are added in or after the last reaction stage.

2. The process according to claim 1, wherein the aromatic hydroxycarboxylic acid(s) or derivative(s) thereof is/are one or more compound(s) of the general formula (VI), (VII) or (VIII)

(VI)

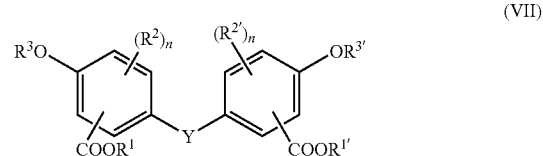

(VII)

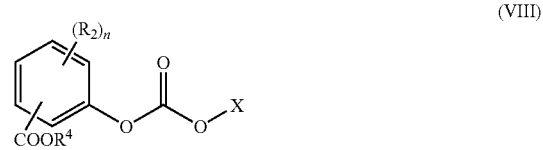

(VIII)

wherein $R^1$ and $R^{1'}$ independently of one another represent H or a linear, cyclic or branched $C_1$-$C_{10}$-alkyl, $C_6$-$C_{34}$-aralkyl radical or a linear, cyclic or branched $C_1$-$C_{10}$-hydroxyalkyl radical, $R^2$ and $R^{2'}$ independently of one another represent a linear or branched $C_1$-$C_{10}$-alkyl, $C_6$-$C_{34}$-aralkyl radical, $R^3$ and $R^{3'}$ independently of one another represent H, a linear or branched $C_1$-$C_{10}$-alkoxycarbonyl or $C_6$-$C_{34}$-arylcarbonyl radical, $R^4$ represents H or a linear or branched $C_1$-$C_{10}$-alkyl, $C_6$-$C_{34}$-aralkyl radical or a linear or branched $C_1$-$C_{10}$-hydroxyalkyl radical, l represents 1 or 2, n represents 0 or an integer from 1 to 3, m represents 1 or 2, Y represents a divalent radical consisting of from 1 to 8 carbon and/or hetero atoms, and X represents a $C_1$-$C_{10}$-alkyl, $C_1$-$C_{10}$-alkylphenyl or a phenyl radical.

3. The process according to claim 2, wherein $R^1$ and $R^{1'}$ independently of one another represent H or a linear or branched $C_1$-$C_6$-alkyl radical or a linear $C_1$-$C_6$-hydroxyalkyl radical, $R^2$ and $R^{2'}$ independently of one another represent H or a linear or branched $C_1$-$C_4$-alkyl radical, $R^3$ and $R^{3'}$ independently of one another represent H, a methylcarbonyl, ethylcarbonyl, propylcarbonyl, phenylcarbonyl, or butylcarbonyl radical, $R^4$ represents H or a linear or branched $C_1$-$C_{10}$-alkyl, $C_6$-$C_{34}$-aralkyl radical or a linear or branched $C_1$-$C_{10}$-hydroxyalkyl radical, l represents 1, n represents 0 or 1, m represents 1, Y represents a —C($R^5$)($R^6$)—, —(C$R^5R^6$)$_m$—, —O—, —S—, —S(=O)—, —S(=O)$_2$—, —(C=O)—, —O(C=O)O—, —O—C($R^5R^6$)O—, particularly preferably —C($R^5$)($R^6$)—, wherein $R^5$ and $R^6$ independently of one another represent a $C_1$-$C_{10}$-alkyl radical, and X represents a phenyl radical.

4. The process according to claim 3, wherein $R^3$ and $R^{3'}$ independently of one another represent H or a methylcarbonyl radical, R⁴ represents H or a linear or branched $C_1$-$C_6$-alkyl radical or a linear $C_1$-$C_6$-hydroxyalkyl radical, and Y represents a —C(R⁵)(R⁶)— wherein R⁵ and R⁶ methyl.

5. The process according to claim 1, wherein the aromatic hydroxycarboxylic acid(s) or derivative(s) thereof is at least one compound selected from the group consisting of 2,4-dihydroxybenzoic acid, 3,5-dihydroxybenzoic acid, 3,5-diisopropylsalicylic acid, 5,5-methylenedisalicylic acid, salicylic acid, acetylsalicylic acid, salicylic acid methyl ester, salicylic acid 2-ethylhexyl ester and salicylic acid n-butyl ester.

6. The process according to claim 1, wherein the inhibitor is a sulfur-containing acid, an ester of organic sulfur-containing acids or mixtures thereof.

7. The process according to claim 5, wherein the inhibitor is a sulfur-containing acid, an ester of organic sulfur-containing acids or mixtures thereof.

8. The process according to claim 1, wherein the dihydroxyaryl compound is at least one compound selected from the group consisting of dihydroxybenzene, dihydroxydiphenyl, bis-(hydroxyphenyl)-alkane, bis-(hydroxyphenyl)-cycloalkane, bis-(hydroxyphenyl)-aryl, bis-(hydroxyphenyl) ether, bis-(hydroxyphenyl) ketone, bis-(hydroxyphenyl) sulfide, bis-(hydroxyphenyl)-sulfone, bis-(hydroxyphenyl) sulfoxide, 1,1'-bis-(hydroxyphenyl)-diisopropylbenzene, compounds thereof that are alkylated on the ring and compounds thereof that are halogenated on the ring.

9. The process according to claim 7, wherein the dihydroxyaryl compound is at least one compound selected from the group consisting of dihydroxybenzene, dihydroxydiphenyl, bis-(hydroxyphenyl)-alkane, bis-(hydroxyphenyl)-cycloalkane, bis-(hydroxyphenyl)-aryl, bis-(hydroxyphenyl) ether, bis-(hydroxyphenyl) ketone, bis-(hydroxyphenyl) sulfide, bis-(hydroxyphenyl)-sulfone, bis-(hydroxyphenyl) sulfoxide, 1,1'-bis-(hydroxyphenyl)-diisopropylbenzene, compounds thereof that are alkylated on the ring and compounds thereof that are halogenated on the ring.

10. The process according to claim 1, wherein the diaryl carbonate(s) one or more compounds of the general formula (II)

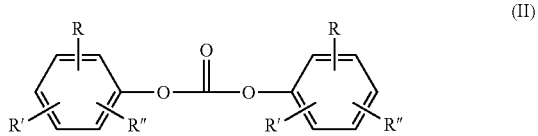

(II)

wherein

R, R' and R" independently of one another are identical or different and represent hydrogen, linear or branched $C_1$-$C_{34}$-alkyl, $C_7$-$C_{34}$-alkylaryl or $C_6$-$C_{34}$-aryl, R can further also represent —COO—R'", wherein R'" represents hydrogen, linear or branched $C_1$-$C_{34}$-alkyl, $C_7$-$C_{34}$-alkylaryl or $C_6$-$C_{34}$-aryl.

11. The process according to claim 9, wherein the diaryl carbonate(s) one or more compounds of the general formula (II)

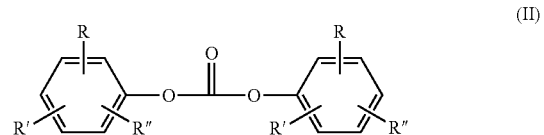

(II)

wherein

R, R' and R" independently of one another are identical or different and represent hydrogen, linear or branched $C_1$-$C_{34}$-alkyl, $C_7$-$C_{34}$-alkylaryl or $C_6$-$C_{34}$-aryl, R can further also represent COO—R'", wherein R'" represents hydrogen, linear or branched $C_1$-$C_{34}$-alkyl, $C_7$-$C_{34}$-alkylaryl or $C_6$-$C_{34}$-aryl.

12. The process according to claim 1, wherein the catalyst is one or more compound(s) selected from the group consisting of alkali, alkaline earth and onium salts.

13. The process according to claim 1, wherein the catalyst(s) comprises onium salts.

14. The process according to claim 11, wherein the catalyst(s) comprises onium salts.

15. The process according to claim 1, which further comprises a branching agent

16. A polycarbonate obtained by the process according to claim 1 and the polycarbonate has a content of phenolic OH end groups of more than 150 ppm.

17. A moldings which comprises the polycarbonate according to claim 16.

18. An extrudate which comprises the polycarbonate according to claim 16.

19. An optical data storage medium which comprises the polycarbonate according to claim 16.

20. A light-diffusing plate which comprises the polycarbonate according to claim 16.

* * * * *